US008863097B2

(12) United States Patent
Thimmel et al.

(10) Patent No.: US 8,863,097 B2
(45) Date of Patent: Oct. 14, 2014

(54) PROVIDING CODE LIST EXTENSIBILITY

(75) Inventors: Bernhard Thimmel, Edingen-Neckarhausen (DE); Friedhelm Krebs, Wiesloch (DE); Andreas Bold, Ludwigshafen (DE); Daniel Zoch, Walldorf (DE); Ralf Dentzer, Hockenheim (DE); Uwe Schlarb, Oestringen (DE); Dirk Richtsteiger, Karlsruhe (DE)

(73) Assignee: SAP AG, Walldorf (DE)

( * ) Notice: Subject to any disclaimer, the term of this patent is extended or adjusted under 35 U.S.C. 154(b) by 645 days.

(21) Appl. No.: 12/981,321

(22) Filed: Dec. 29, 2010

(65) Prior Publication Data

US 2012/0174081 A1 Jul. 5, 2012

(51) Int. Cl.
  G06F 9/45 (2006.01)
  G06F 9/54 (2006.01)
  G06F 9/30 (2006.01)
  G06F 9/44 (2006.01)

(52) U.S. Cl.
  CPC ........ *G06F 8/51* (2013.01); *G06F 9/541* (2013.01); *G06F 9/30181* (2013.01); G06F 8/30 (2013.01)
  USPC ............ 717/137; 717/106; 717/111; 717/121

(58) Field of Classification Search
  CPC ....... G06F 8/51; G06F 9/541; G06F 9/30181; G06F 8/30
  See application file for complete search history.

(56) References Cited

U.S. PATENT DOCUMENTS

| 6,338,097 | B1   | 1/2002  | Krenzke et al. |         |
|-----------|------|---------|----------------|---------|
| 6,427,228 | B1 * | 7/2002  | Wigger         | 717/111 |
| 7,386,840 | B1 * | 6/2008  | Cockerham et al. | 717/137 |
| 7,689,561 | B2   | 3/2010  | Daum et al.    |         |
| 7,707,432 | B2   | 4/2010  | Colle et al.   |         |
| 7,721,259 | B2 * | 5/2010  | Heinke et al.  | 717/121 |
| 7,743,386 | B2   | 6/2010  | Beunings et al. |        |
| 7,778,965 | B2   | 8/2010  | Bindewald et al. |       |
| 8,286,146 | B2 * | 10/2012 | Richmond       | 717/137 |
| 2002/0040469 | A1 * | 4/2002 | Pramberger   | 717/121 |
| 2005/0091638 | A1 * | 4/2005 | Bley          | 717/111 |
| 2006/0206861 | A1 * | 9/2006 | Shenfield et al. | 717/106 |
| 2006/0206876 | A1 * | 9/2006 | Barton et al. | 717/137 |

(Continued)

OTHER PUBLICATIONS

Daniel Amyot, Understanding Existing Software with Use Case Map Scenarios, 2002, pp. 1-15.*

(Continued)

Primary Examiner — Thuy Dao
Assistant Examiner — Mongbao Nguyen
(74) Attorney, Agent, or Firm — Fish & Richardson P.C.

(57) ABSTRACT

A computer implemented method for providing code list extensibility includes providing a first code data type representation. The first code data type representation corresponding to a first code data type and having a first code value representation for at least one code value. The at least one code value associated with a corresponding code value issuing entity. The method may also include providing a second code data type representation. The second code data type representation corresponding to the first code data type and having a second code value representation for the at least one code value. The second code value representation including a unique identifier associated with the code value issuing entity. The method also may include mapping the first code data type representation and the second code data type representation based at least in part on the unique identifier associated with the code value issuing entity.

19 Claims, 11 Drawing Sheets

(56) References Cited

U.S. PATENT DOCUMENTS

| | | |
|---|---|---|
| 2007/0016889 A1* | 1/2007 | Miyazaki .................. 717/106 |
| 2007/0209041 A1* | 9/2007 | Exley et al. ............... 719/328 |
| 2007/0271107 A1 | 11/2007 | Fiedler et al. |
| 2007/0299704 A1* | 12/2007 | Wildhagen et al. ............ 705/7 |
| 2008/0120595 A1* | 5/2008 | O'Farrell et al. ............ 717/106 |
| 2008/0189235 A1* | 8/2008 | Mital et al. ................ 706/52 |
| 2008/0235659 A1* | 9/2008 | Manglik et al. ............. 717/111 |
| 2008/0276225 A1 | 11/2008 | Saterdag et al. |
| 2008/0278198 A1 | 11/2008 | Saterdag et al. |
| 2008/0307395 A1 | 12/2008 | Zoch et al. |
| 2008/0307433 A1 | 12/2008 | Zoch et al. |
| 2009/0089309 A1 | 4/2009 | Thimmel et al. |
| 2009/0112916 A1* | 4/2009 | Stuhec .................... 707/102 |
| 2009/0171698 A1 | 7/2009 | Suenderhauf et al. |
| 2009/0171716 A1 | 7/2009 | Suenderhauf et al. |
| 2009/0313613 A1* | 12/2009 | Ben-Artzi et al. ............ 717/137 |
| 2010/0088117 A1* | 4/2010 | Belden et al. .................. 705/3 |
| 2010/0125579 A1* | 5/2010 | Pardoe et al. .............. 707/736 |
| 2010/0161366 A1* | 6/2010 | Clemens et al. ................ 705/8 |
| 2010/0179946 A1 | 7/2010 | Daum et al. |
| 2010/0250505 A1 | 9/2010 | Dentzer |
| 2010/0250506 A1 | 9/2010 | Dentzer |
| 2011/0029593 A1* | 2/2011 | Howard et al. .............. 709/203 |
| 2011/0035742 A1* | 2/2011 | Shenfield .................. 717/171 |
| 2011/0145789 A1* | 6/2011 | Rasch et al. ............... 717/121 |

OTHER PUBLICATIONS

Istvan Novak, Visual Studio Platform and Extensibility, 2008, pp. 1-14.*

Mahendhran Arumugam, Mapping and Relating XML Business Object Structures—A Case Study, 2003, 13-40.*

* cited by examiner

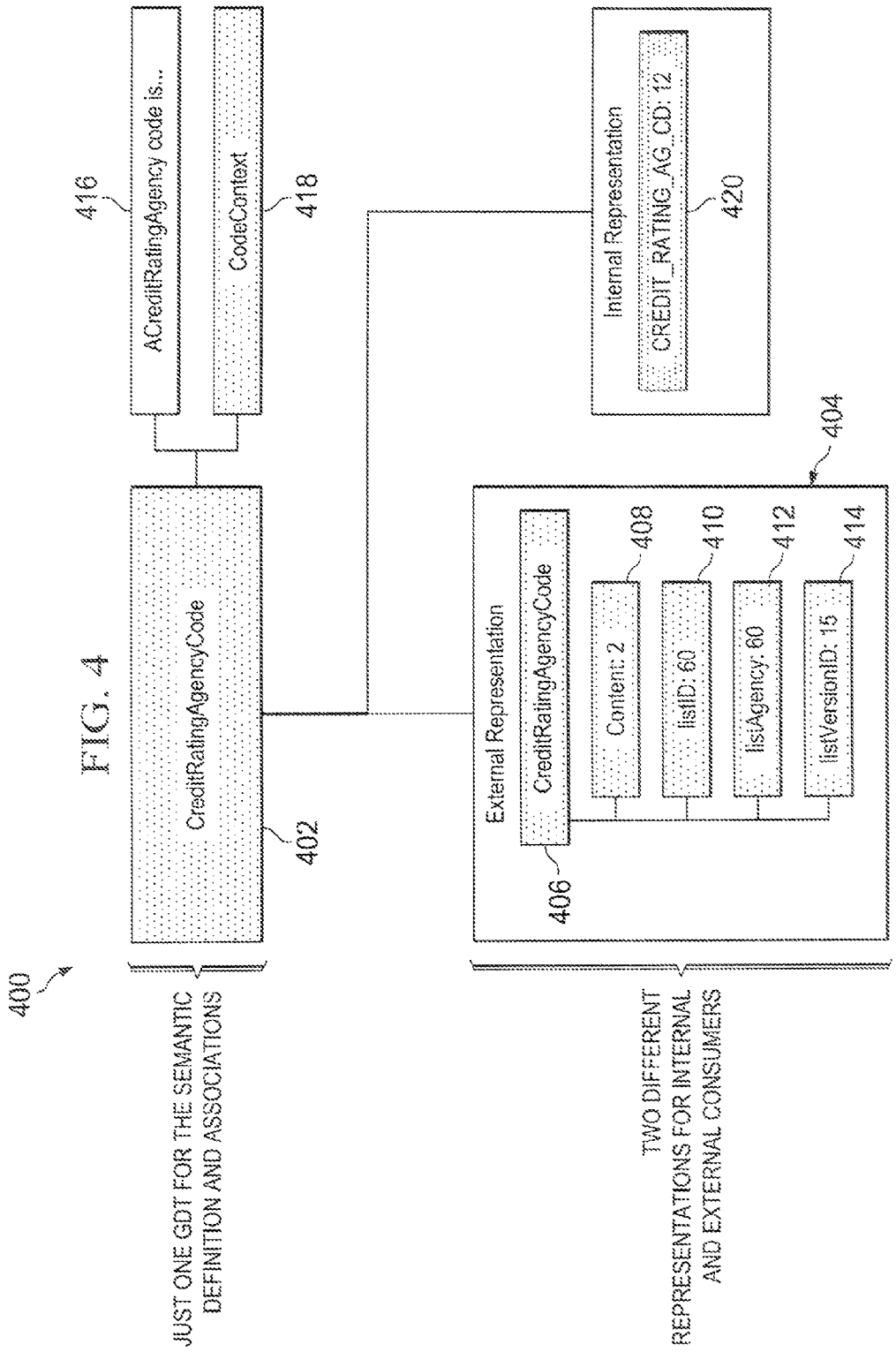

Table for Credit Rating Agencies 500

| CreditRatingAgencyCode | | Ext. Code | CodeList |
|---|---|---|---|
| 1 | Schufa | 1 | 1 |
| 2 | Dun & Bradstreet | 2 | 1 |
| /ISVM 502 | Bürgel | 1 310 | /ISVM 504 |
| ZA | Own Ranking | A 328 | Z1 |

FIG. 5A

Table for Code Lists

550

| CodeList | | ListID | ListAgencyID |
|---|---|---|---|
| 1 | SAP list of CreditRatingAgencies | 120 | 310 |
| ISV1/1 504 | ISV1 extension list of SAP list of CreditRatingAgencies | 1 316 | www.isv1.com 318 |
| Z1 | Customer extension list of SAP list of CreditRatingAgencies | 17 | www.user.com |
| ... | ... | ... | ... |

FIG. 5B

Table for Credit Ratings

| CreditRatingAgencyCode | CreditRatingCode | Ext. Code | CodeList |
|---|---|---|---|
| 1 | AAA | AAA | 4 |
| 1 | Z1 | Z1 | Z2 |
| 2 | 1 | ' | 8 |
| 2 | 2 | 2 | 8 |
| 2 | /ISV1/X | X | /ISV1/2 |
| /ISV1/1 | /ISV1/X | X | /ISV1/3 |
| /ISV1/1 | /ISV1/Y | Y | /ISV1/3 |
| /ISV1/1 | Z1 | Z1 | Z3 |
| ... | ... | ... | ... |

FIG. 7

System Table for Business Object Type Codes

900

| Business Object Type Code | Attribute 1 | Attribute 2 | Transport Object |
|---|---|---|---|
| 00001 | Purchase Order | ... | |
| 00002 | Sales Contract | ... | |
| ... | | ... | |
| /ISV1/1 | ISV BO | ... | /ISV1/BO1 |

{ extended key

FIG. 9

Add-on 1

ABAP-Namespace: /ISV1PRD1/
XML-Namespace: http://www.isv1.com/product1/

| Int Value | Context | Ext Val | Ts ID | Agency |
|---|---|---|---|---|
| /ISV1PRD1/1 | - | 1 | product1/ | http://www.isv1.com/ |
| /ISV1PRD1/1 | DE | 1 | product1/4711 | http://www.isv1.com/ |

Add-on 2

ABAP-Namespace: /ISV1PRD2/
XML-Namespace: http://www.isv1.com/product2/

| Int Value | Context | Ext Val | Ts ID | Agency |
|---|---|---|---|---|
| /ISV1PRD2/1 | - | 1 | product2/ | http://www.isv1.com/ |
| /ISV1PRD2/1 | DE | 1 | product2/4711 | http://www.isv1.com/ |

PROVIDING CODE LIST EXTENSIBILITY

TECHNICAL FIELD

This invention relates to the extensibility of code lists across internal and external representations thereof.

BACKGROUND

Functions may be added or overlaid onto preexisting objects by extending associated code lists. Code lists can enumerate design time entities, such as process component code, object type code, and service interface code. Likewise, code lists can label configuration entities. Codes may be used for business object persistence, messages, and for foreign key relationships in system and configuration tables.

Some codes are based on official standard code lists, like ISO codes or United Nations Centre for Trade Facilitation and Electronic Business (UNCEFACT) codes, many of them are developed by backend providers, independent software vendors, or customers.

SUMMARY

The present disclosure describes systems, methods, and apparatuses for providing code list extensibility. In certain embodiments, a method may include providing a first code data type representation corresponding to a code data type. The first code data type representation may include a first code value representation for at least one code value, the at least one code value associated with a corresponding code value issuing entity. The method may also include providing a second code data type representation, the second code data type representation corresponding to the code data type. The second data type representation may have a second code value representation for the at least one code value, the second code value representation including a unique identifier associated with the code value issuing entity. The method may also include mapping the first code data type representation and the second code data type representation based at least in part on the unique identifier associated with the code value issuing entity.

A system for providing code list extensibility may include a memory for storing instructions and at least one hardware processor operable to execute instructions stored on the memory. The instructions may include providing an external code data type representation. The external code data type representation corresponds to a code data type and has an external code value representation for at least one code value. The at least one code value may be associated with a corresponding code value issuing entity. The system may also include instructions to provide an internal code data type representation corresponding to the code data type. The internal data type representation may have an internal code value representation for the at least one code value. The internal code value representation may include an internal unique identifier associated with the code value issuing entity. The instructions may also map the external code data type representation and the internal code data type representation based at least in part on the internal unique identifier associated with the code value issuing entity.

In certain implementations of the embodiments, the second code data type representation may accommodate an Advanced Business Application Programming (ABAP) namespace. In certain implementations, the unique identifier associated with the code value issuing entity may be an ABAP namespace prefix provided by the issuing entity.

In certain implementations of the embodiments, the unique identifier may be a first unique identifier associated with a first software program associated with the code value issuing entity. In certain implementations, the embodiments may also include a second unique identifier that is associated with a second software program associated with the code value issuing entity.

In certain implementations of the embodiments, the first code data type representation also includes an agency identifier, the agency identifier identifying the code value issuing entity.

In certain implementations of the embodiments, the first code data type representation may be a Core Components Technical Specification (CCTS) based representation.

In certain implementations of the embodiments, the mapping may be performed by serialization or deserialization.

In certain implementations of the embodiments, the second code data type representation unique identifier provides a unique prefix associated with the issuing entity, the second code data type representation further identifying a system type code, the system type code identified using the unique identifier. In certain implementations of the embodiments, the second code data type representation may also include a transport object identifier, the transport object identifier including the unique prefix and a customer identifier.

In certain implementations of the embodiments, the internal representation also includes a client specific switch value that may facilitate a client specific filtering of the code values.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 4 is a schematic illustration of a code data type having an external representation and an internal representation.

FIG. 5A is an example table illustrating a mapping between the code values with a unique identifying prefix and the code values for the external representation.

FIG. 5B is a table illustrating a mapping between the internal representation of the code lists and the supplementary components.

FIG. 7 is a table showing the mapping between the external representation of the code data type having a context with possible internal representations having identifiers with the code values.

FIG. 9 is a system table design to support multi-tenancy situations.

FIG. 10 is a schematic illustration of an Independent Software Vendor (ISV) based code list agency and product based list identifier (ID).

DETAILED DESCRIPTION

Figure 1:
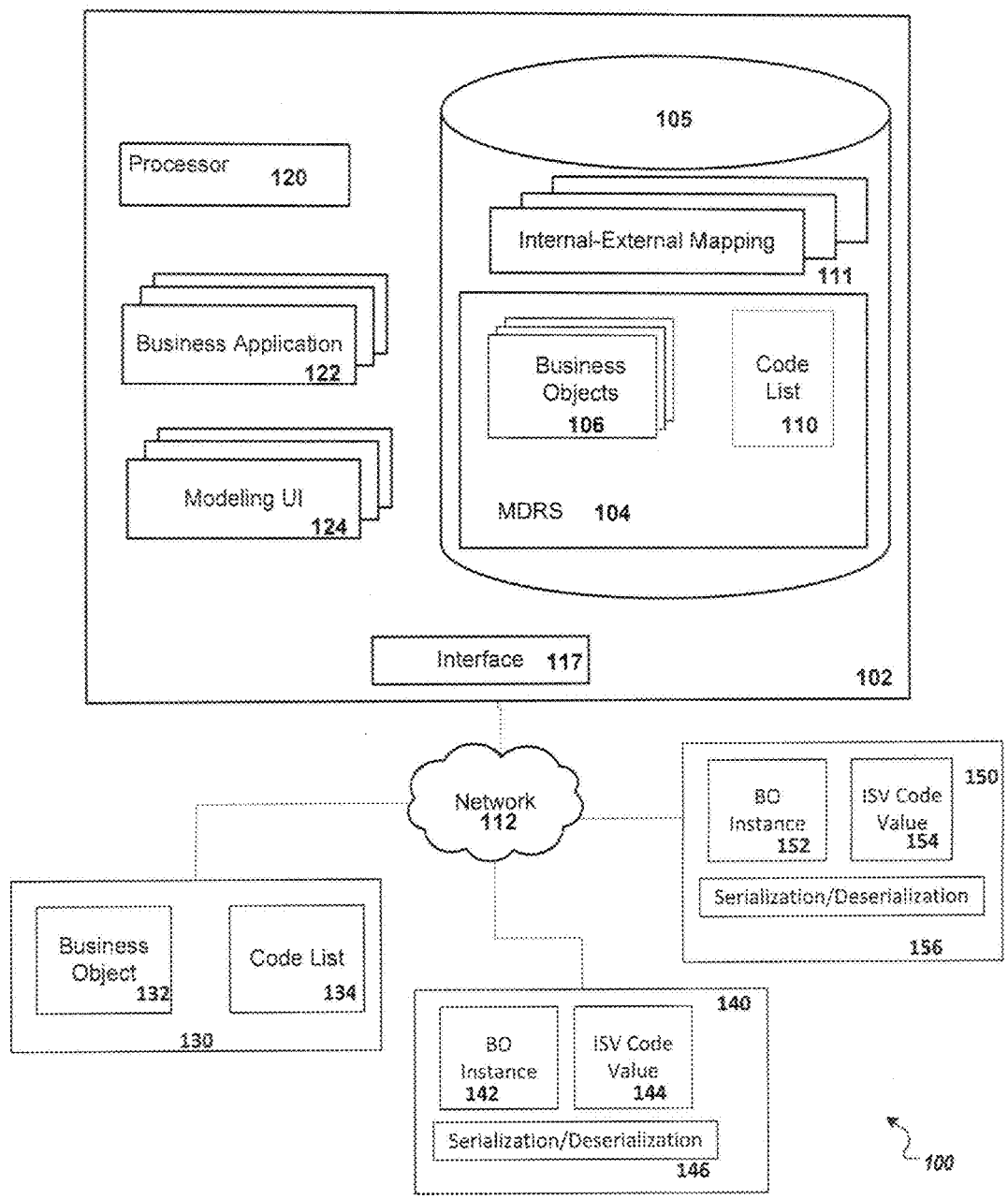
FIG. 1 is a schematic illustration of a service system for providing code list extensibility for internal and external representations of code lists.

FIG. 1 is a schematic illustration of a service system 100 for providing code list extensibility for internal and external representations of code lists. For example, the system of FIG. 1 may be used to model code lists to allow for a mapping of code values across internal and external representations of the code lists. Mapping internal and external code lists facilitates the ability of software partners, such as independent software vendors, to uniquely customize or otherwise modify proprietary business objects while maintaining fundamental functionality of the business object. Similarly, a customer can implement business object customization across a plurality of systems from a plurality of vendors with little or no risk of coincidental code list values across disparate systems. To provide for uniqueness in code values across business partners and across a single business partner's software implementations, internal representations of code values may include an identifier, such as an ABAP namespace. The internal representations may be mapped to the external representations, and vice versa, through serialization/deserialization techniques, 1:1 mapping, or other techniques described further herein. The term "serialization" may be used herein as a general term that includes serialization and deserialization.

According the present disclosure, the internal representation accommodates a multi-tenant configuration. Certain information stored in the system may be tenant-specific, while other information is tenant non-specific. Multiple companies can run a software suite, and each of these companies can be considered a tenant of the software suite or system running the software suite. Data associated with each tenants is separated so data for a first company does not appear in the context of a second company. Database tables may be used for internal representations of the code data types.

At a high level, the system 100 includes a server 102 communicably coupled to one or more partners 130 and one or more customers 140 and 150 through a network 112. The terms "partner" and "ISV" are used to mean any entity that interacts with server 102, and may provide modification, additions, new functionality, or any changes to software offered by a provider, and the terms may be used interchangeably in this disclosure. Partners 130 may communicate with customers 140/150 across network 112, as well. Similarly, customers 140 and 150 may communicate with each other across network 112. ISV 130 may access the server 102 to model business objects, such as business objects (BOs) 132, stored on ISV 130. Further, the ISV 130 may provide new functionality to systems or objects, and may generate code values 134 associated with the new functionality.

The server 102 may be an electronic device operable to receive and process registration information from outside entities, such as customers or partners; process requests, such as service requests; process business objects in response to requests; execute predefined rules using the business objects; provide processing for business object modeling and data type modeling; and provide the request for consumer services using the fields and/or methods updated by one or more rules. The server 102 includes memory 105 and a processor 120. The metadata repository (MDRS) 104 may persist on memory 105. MDRS 104 may be used for identifying metadata as well as business objects 106. Likewise, MDRS 104 may be used for modeling of business objects, as well as code value representations. The processor 120 processes service requests including requests for services based on business objects 106. At a high level of operation, the processor 120 may receive a service request from the user device 104 and identify an associated business application 122. The business application 122 may identify one or more business objects 106, which may be used in the execution of commands. Such commands may be associated with codes that translate commands between entities, such as partners, ISVs, and/or customers. The business application 122 may generate the consumer service, including the modified business element, or otherwise incorporate the modified business element in the request consumer service.

Turning to the illustrated implementation, system 100 may be a distributed client/server system that allows clients 140 to submit requests to store and/or retrieve information from metadata repository 104 maintained within memory 105 on server 102. But system 100 may also be a standalone computing environment or any other suitable environment, such as an administrator accessing data stored on server 102, without departing from the scope of this disclosure. System 100 may allow access to individual business objects 106 within the metadata repository 104 using access methods such as Java, COM/DCOM (Component Object Model/Distributed Component Object Model), CORBA (Common Object Request Broker Architecture), RFC (Remote Function Call), and Hypertext Transfer Protocol (HTTP), or other suitable access methods.

At design time or at least at some time prior to execution of object instructions, codes associated with available business objects are imported by software logistics into the two customer systems 140 and 150. Customer 140 may communicate with customer 150 through the use of Extensible Markup Language (XML) messaging. For example, the customer might use the same ISV solution to perform some task or engage in business transactions. The messages include codes associated with objects and are in the form of an external (e.g., CCTS-compliant) representation of the code data type. For these codes, a mapping between the internal and external representation of the code data types is used to interpret the information carried by the code value.

When messages are used, the code 144 is built up for one of the business object instances 142. Serialization 146 is used to translate the code to the external representation. When the message is received by customer 150, deserialization of the message translates the external representation to the internal representation of the codes to be used as part of the system. Customer 150 can also generate business object instances 152 having code values 154 issued by the ISV 130, which can be serialized to form the external representation for XML message communication to another customer.

As for a more detailed description of the illustrated implementation, the server 102 includes memory 105 and processor 120 and comprises an electronic computing device operable to receive, transmit, process and store data associated with system 100, For example, server 102 may be any computer or processing device such as a mainframe, a blade server, general-purpose personal computer (PC), Macintosh, workstation, Unix-based computer, or any other suitable device, Generally, FIG. 1 provides merely one example of computers that may be used with the disclosure. In other words, the present disclosure contemplates computers other than general purpose computers as well as computers without conventional operating systems. As used in this document, the term "computer" is intended to encompass a personal computer, workstation, network computer, or any other suitable processing device. For example, although FIG. 1 illustrates one server 102 that may be used with the disclosure, system 100 can be implemented using computers other than servers, as well as a server pool. Server 102 may be adapted to execute any operating system 110 including z/OS, Linux-Intel or Linux/390, UNIX, Windows Server, or any other suitable operating system. According to one implementation, server 102 may also include or be communicably coupled with a web server and/or a Simple Mail Transfer Protocol (SMTP) server.

Memory 105 may include any memory or database module and may take the form of volatile or non-volatile memory including, without limitation, magnetic media, optical media, random access memory (RAM), read-only memory (ROM), removable media, or any other suitable local or remote memory component. In this implementation, illustrated memory 105 includes transformation rules 135 and metadata repository 104.

In some implementations, the metadata repository 104 may be stored in one or more tables in a relational database described in terms of Structured Query Language (SQL) statements or scripts. In the same or other implementations, the metadata repository 104 may also be formatted, stored, or defined as various data structures in text files, eXtensible Markup Language ("XML") documents, Virtual Storage Access Method ("VSAM") files, flat files, Btrieve files, comma-separated-value ("CSV") files, internal variables, or one or more libraries. In short, the metadata repository 104 may comprise one table or file or a plurality of tables or files stored on one computer or across a plurality of computers in any appropriate format. Indeed, some or all of the metadata repository 104 may be local or remote without departing from the scope of this disclosure and store any type of appropriate data. In particular implementations, the metadata repository 104 may access the business objects 106 in response to requests from external entities. In certain implementations, system 102 is a development system, and a partner or ISV may access the metadata repository 104 to model the business objects in the MDRS 104 across network 112.

These business objects 106 may represent organized data relating to some project or endeavor, which may or may not be linked, with each object having one or more states related to the object. Each of the states, in turn, may be associated with data that pertains to various modifiable parameters of the individual states of the object. One type of data modeling that includes multiple objects with each having multiple states, and each state having multiple instances of changes to the state's modifiable parameters is the business object model. The overall structure of a business object model ensures the consistency of the interfaces that are derived from the business object model. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is thus a capsule with an internal hierarchical structure, behavior offered by its operations, and integrity constraints. Business objects are generally semantically disjointed, i.e., the same business information is represented once. In some implementations, the business objects are arranged in an ordering framework such that they can be arranged according to their existence dependency to each other. For example, in a modeling environment, the customizing elements might be arranged on the left side of the business object model, the strategic elements might be arranged in the center of the business object model, and the operative elements might be arranged on the right side of the business object model. Similarly, the business objects can be arranged in this model from the top to the bottom based on defined order of the business areas, e.g., finance could be arranged at the top of the business object model with customer relationship management (CRM) below finance and supplier relationship management (SRM) below CRM. To help ensure the consistency of interfaces, the business object model may be built using standardized data types, as well as packages, to group related elements together, and package templates and entity templates to specify the arrangement of packages and entities within the structure.

In one implementation, metadata repository 104 may be referenced by or communicably coupled with applications executing on or presented to external entities. In some implementations, the metadata repository 104 may be searchable, such as by requests from clients 140 via the network 112. Distinct business objects 106, as well as multiple instances of a single business object 106, may be searched to allow the user and/or application to find a business object type or a specific instance thereof on demand.

Server 102 also includes processor 120. Processor 120 executes instructions and manipulates data to perform the operations of server 102 such as, for example, a central processing unit (CPU), a blade, an application specific integrated circuit (ASIC), or a field-programmable gate array (FPGA). In particular, processor 120 performs any suitable tasks associated with metadata repository 104. Although FIG. 1 illustrates a single processor 120 in server 102, multiple processors 120 may be used according to particular needs and reference to processor 120 is meant to include multiple processors 120 where applicable.

Server 102 may also include interface 117 for communicating with other computer systems, such as ISV 130 and customers 140 and 150, over network 112 in a client-server or other distributed environment. In certain implementations, server 102 receives requests for data access from local or remote senders through interface 117 for storage in memory 105 and/or processing by processor 120. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Server 102 may also include or reference a local, distributed, or hosted business application 122. At a high level, business application 122 is any application, program, module, process, or other software that may access, retrieve, modify, delete, or otherwise manage some information of the metadata repository 104 in memory 105. Specifically, business application 122 may access the metadata repository 104 to retrieve or modify data stored within specific business objects 106 as requested by a user and/or another application. Business application 122 may be considered a business software or solution that is capable of interacting or integrating with metadata repository 104 located, for example, in memory 105 to provide access to data for personal or business use. An example business application 122 may be a computer application for performing any suitable business process by implementing or executing a plurality of steps. One example of a business application 122 is an application that may provide interconnectivity with one or more business object repositories 104 containing product development information such that records may be dispersed among a plurality of business objects 106. As a result, business application 122 may provide a method of accessing requested data and presenting it to the user and/or application such that the user and/or application are provided information through a graphical user interface ("GUI") interface in a centralized manner. Business application 122 may also provide the user with a computer implementable method of implementing a centralized source for agreements on one or more solutions identified by a solution provider.

More specifically, business application 122 may be a composite application, or an application built on other applications that include an object access layer (OAL) and a service layer. In this example, application 122 may execute or provide a number of application services, such as CRM systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help composite application 122 to orchestrate a business process in synchronization with other existing processes (e.g., native processes of enterprise base systems) and leverage existing investments in the Informaton Technology (IT) platform. Further, composite application 122 may nm on a heterogeneous IT platform. In doing so, composite application 122 may be cross-functional in that it may drive business processes across different applications, technologies, and organizations. Accordingly, composite application 122 may drive end-to-end business processes across heterogeneous systems or sub-systems. Application 122 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes the composite application 122, it may instead be a standalone or (relatively) simple software program. Regardless, application 122 may also perform processing automatically, which may indicate that the appropriate processing is substantially performed by at least one component of system 100. It should be understood that this disclosure further contemplates any suitable administrator or other user interaction with application 122 or other components of system 100 without departing from its original scope. Finally, it will be understood that system 100 may utilize or be coupled with various instances of business applications 122.

For example, ISV 130 may be a partner that may implement changes to business application 122. Such changes may include ISV specific add-on functionality or other changes. Such changes may be manifested in the form of new business object functionality or other new software coding. The changes or additions to business application 122 may prompt the generation of ISV related code values associated with the ISV, the new software, or both. ISV 130 may create multiple add-ons for a business application 122, or may create add-ons for multiple business applications. The add-on functionality may be sold to customers as stand-alone packages or bundled with business application 122.

Business application 122 may be a generic application that supports multiple ISV specific functionality add-ons. Customers using business application 122 may or may not have access to add-ons depending on their relationship with the ISV (i.e., whether the customer has purchased the added functionality of the add-on). In that sense, generic business applications (and internal representations of code data types associated therewith) may support multi-tenancy, which is described in more detail below.

Portions of the application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to server 102, one or more processes associated with application 122 may be stored, referenced, or executed remotely. For example, a portion of application 122 may be a web service that is remotely called, while another portion of application 122 may be an interface object bundled for processing at remote client. Moreover, application 122 may be a child or sub-module of another software module or enterprise application (not illustrated) without departing from the scope of this disclosure. Indeed, application 122 may be a hosted solution that allows multiple parties in different portions of the process to perform the respective processing. For example, client may access application 122, once developed, on server 102 or even as a hosted application located over network 112, without departing from the scope of this disclosure. In another example, portions of software application 122 may be developed by the developer working directly at server 102, as well as remotely at client. Regardless of the particular implementation, "software" may include software, firmware, wired or programmed hardware, or any combination thereof as appropriate. Indeed, each of the foregoing software applications may be written or described in any appropriate computer language including C, C++, Java, Visual Basic, assembler, Perl, any suitable version of 4GL, as well as others. It will be understood that while these applications are shown as a single multi-tasked module that implements the various features and functionality through various objects, methods, or other processes, each may instead be a distributed application with multiple sub-modules. Further, while illustrated as internal to server 102, one or more processes associated with these applications may be stored, referenced, or executed remotely. Moreover, each of these software applications may be a child or sub-module of another software module or enterprise application (not illustrated) without departing from the scope of this disclosure.

Network 112 facilitates wireless or wireline communication between computer server 102 and any other local or remote computer, such as clients 140. Indeed, while illustrated as a continuous network 112, network 112 may be multiple networks without departing from the scope of this disclosure, so long as at least portion of network 112 may facilitate communications between senders and recipients of requests and results. In other words, network 112 encompasses any internal and/or external network, networks, sub-network, or combination thereof operable to facilitate communications between various computing components in environment 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations.

Customer 140 is any local or remote computing device operable to run business applications, such as applications 122. Business applications may be run from server 102, a server associated with ISV 130, or local to customer 140. Customer 140 may be an example of a customer, and customer 150 may be another customer. The two customers may communicate directly with one another across a network, such as network 112, or may communicate with/through server 102 or ISV 130.

It will be understood that there may be any number of customers 140 or 150 communicably coupled to server 102. For example, illustrated customer 140 may includes one local client and two clients external to the illustrated portion of enterprise 100. This disclosure contemplates that many customers may use a computer or that one user may use multiple computers to submit or review queries via a graphical user interface. As used in this disclosure, customers may operate remote devices, such as personal computers, touch screen terminals, workstations, network computers, kiosks, wireless data ports, wireless or wireline phones, personal data assistants (PDA), one or more processors within these or other devices, or any other suitable processing device, to execute operations associated with business applications. For example, customer 140 may comprise a computer that includes an input device, such as a keypad, touch screen, mouse, or other device that can accept information, and an output device that conveys information associated with the operation of server 102 or customers 140, including digital data, visual information, or GUI. Both the input device and output device may include fixed or removable storage media such as a magnetic computer disk, CD-ROM, or other suitable media to both receive input from and provide output to users of customer 140 through the display, namely, GUI.

GUI includes a graphical user interface operable to allow the user of client to interface with at least a portion of system 100 for any suitable purpose. Generally, GUI provides the user of client with an efficient and user-friendly presentation of data provided by or communicated within system 100. GUI 144 may provide access to the front-end of business application 122 executing on client that is operable to access one or more business objects 106 stored within metadata repository 104. In another example, GUI may display output reports such as summary and detailed reports. GUI may comprise a plurality of customizable frames or views having interactive fields, pull-down lists, and buttons operated by the user. In one implementation, GUI presents information associated with queries and buttons and receives commands from the user of customer 140 via one of the input devices. Moreover, it should be understood that the term graphical user interface may be used in the singular or in the plural to describe one or more graphical user interfaces and each of the displays of a particular graphical user interface. Therefore, GUI contemplates any graphical user interface, such as a generic web browser or touch screen that processes information in system 100 and efficiently presents the results to the user. Server 102 can accept data from customer 140 via the web browser (e.g., Microsoft Internet Explorer or Mozilla Firefox) and return the appropriate Hypertext Markup Language (HTML) or XML responses using network 112. For example, server 102 may receive a request from customer using the web browser and then execute the request to store and/or retrieve information and data from a business object 106 stored within metadata repository 104.

Figure 2:
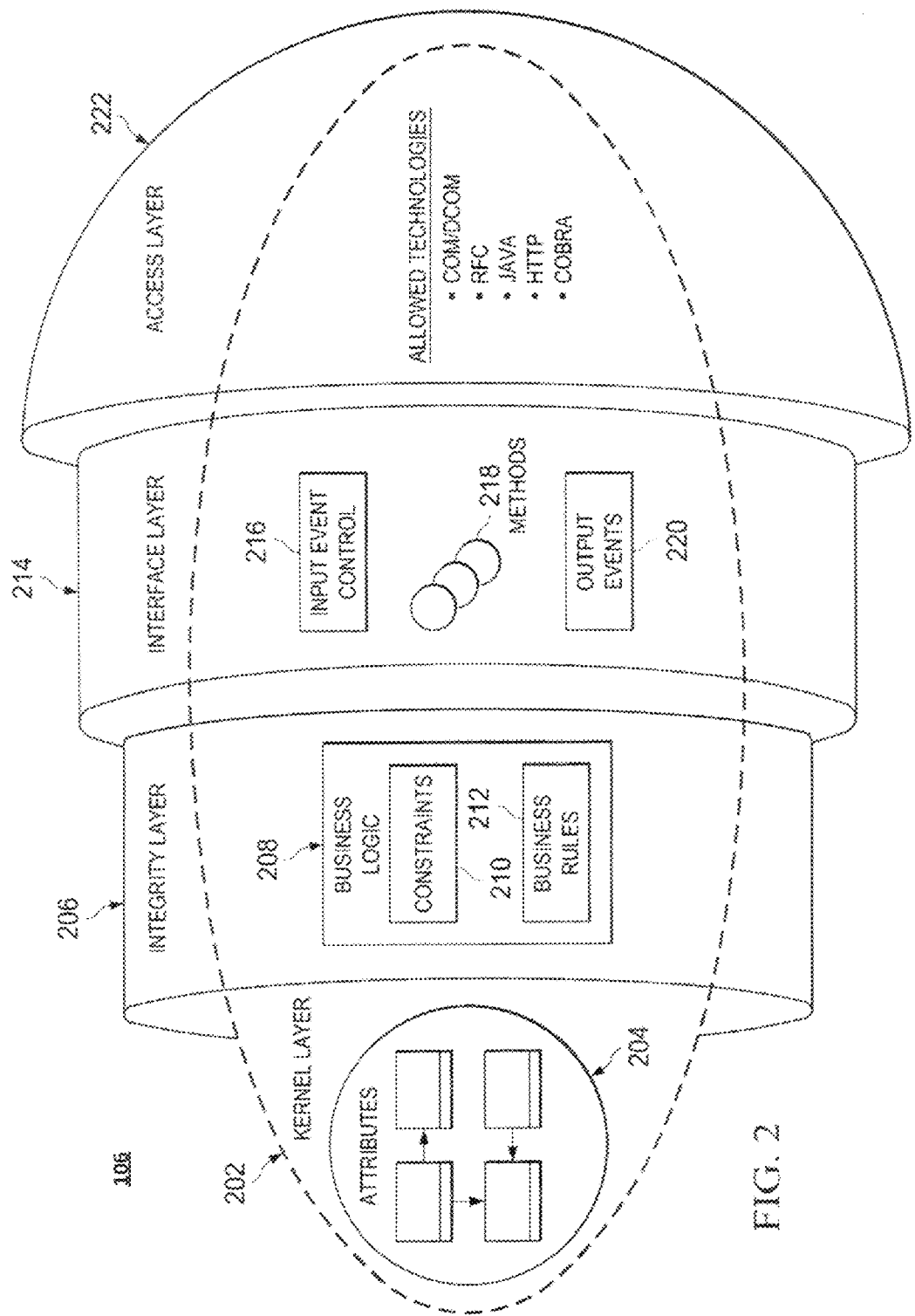
FIG. 2 is a schematic representation of the structure of a generic business object.

FIG. 2 is a schematic representation of the structure of a generic business object 106 in the system 100. In general, the overall structure of the business object model ensures the consistency of the interfaces that are derived from the business object model. The derivation helps ensure that the same business-related subject matter or concept can be represented and structured in the same way in various interfaces. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

A business object is a capsule with an internal hierarchical structure, behavior offered by its operations, and integrity constraints. As discussed above, business objects are semantically disjointed, i.e., the same business information is represented once. A business object may be defined such that it contains multiple layers, such as in the example business object 106 of FIG. 2. The example business object 106 contains four layers: the kernel layer 202, the integrity layer 206, the interface layer 214, and the access layer 222. The innermost layer of the example business object is the kernel layer 202. The kernel layer 202 represents the business object's inherent data, containing various attributes of the defined business object. The second layer represents the integrity layer 206. In the example business object 106, the integrity layer 206 contains the business logic 208 of the object. Such logic may include business rules 212 for consistent embedding in the environment 100 and the constraints 210 regarding the values and domains that apply to the business object 106. Business logic 208 may comprise statements that define or constrain some aspect of the business, such that they are intended to assert business structure or to control or influence the behavior of the business entity. It may pertain to the facts recorded on data and constraints on changes to that data. In effect, business logic 208 may determine what data may, or may not, be recorded in business object 106a. The third layer, the interface layer 214, may supply the valid options for accessing the business object 106 and describe the implementation, structure, and interface of the business object to the outside world. To do so, the interface layer 214 may contain methods 218, input event controls 216, and output events 220. The fourth and outermost layer of the business object 106 in FIG. 2 is the access layer 222. The access layer 222 defines the technologies that may be used for external access to the business object's data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects 106 of this instance may implement standard object-oriented technologies such as encapsulation, inheritance, and/or polymorphism.

Figure 3:
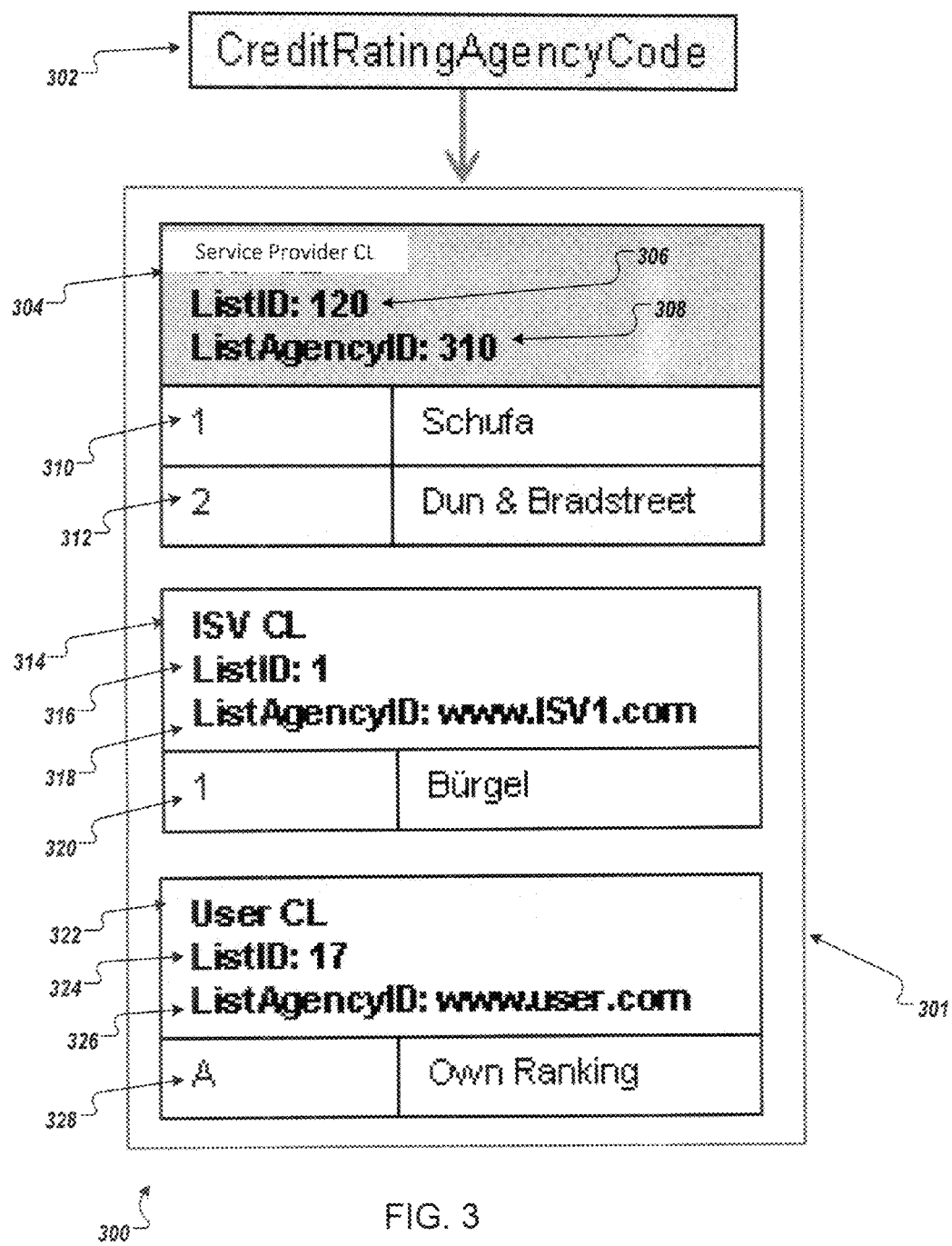
FIG. 3 is a schematic illustration of an external representation of a code data type.

FIG. 3 is a schematic illustration of an external representation of a code data type. The term "external" may be understood to be a representation used in messaging between customers or independent software vendors. The term "internal" may represent the database representation of a code list. FIG. 3 is an example of two code list extensions for the code data type "CrediRatingAgencyCode." It may be desirable for (external) entities implementing business objects, such as development partners, independent software vendors, customers, etc., to be able to add new code values to code global data types (GDTs) defined by a backend provider or developer, and use the codes in processes. Codes may be identified by their actual code value and by the list to which they belong. While code values within one code list may be unique, the code values from different code lists may coincide. A code list may express the issuing context of the code. The list itself may be identified using supplementary components for the code. For example, supplementary components include, among other things:

listID: Identifies a list of the codes that belong together. The list ID is unique within the agency that manages this code list.

listVersionID: Identifies the version of a code list.
listAgencyID: Identifies the agency that manages the code list (issuer). This agency is responsible for the content of the code list and, therefore, also responsible for issues that arise with the code list.
In XML, the external representation may look as follows:

```
<CreditRatingAgencyCode listID="120"
listAgencyID="310">1</CreditRatingAgencyCode>,
``` for the Service Provider Code List 304.

In some implementations, the code list model representation may follow the Core Component Technical Specification (CCTS) standard.

The listID provides the code list ID, in this case for the Service Provider Code List (CL) shown in FIG. 3. The listAgencyID is an ID associated with the issuing entity of the code value. In FIG. 3, three code lists for the code data type CreditRatingAgencyCode 302 are illustrated. The first code list 304 comes from the provider, indicated as Service Provider CL 304. Supplementary components are also indicated, such as "listID 120" 306, "listAgencyID 310" 308. In addition, code values "1" 310 and "2" 312 are shown in Service Provider Code List 306. Code value "1" 310 also has a name, "Schufa," which is the name of a credit rating agency associated with the code value "1" 310 in the Service Provider CL 304 for the CreditRatingAgencyCode code data type 302. Similarly, code value "2" 312 has an associated credit rating agency, "Dun & Bradstreet." The second code list 314 may be from an independent software vendor ("ISV"), indicated as ISV CL. Similarly, the second code list 314 may include components listID "1" 316 and "listAgencyID www.ISV1.com" 318. A code value "1" 320 is also illustrated in association with the ISV code list 314, and the value "1" 320 has an associated credit rating agency "Bürgel". It can be seen that the code value "1" 310 from the Service Provider CL 304 that corresponds to the credit rating agency "Schufa" is the same code value that corresponds to the credit rating agency "Bürgel" in the ISV CL 314. The third code list 322 may be one from a customer, indicated as User CL. Components listID "17" 324 and listAgencyID "www.user.com" 326 are also indicated. A code value "A" 328 is illustrated in association with the third code list 322.

The list is assigned to the code data type "CreditRatingAgencyCode" 302. In FIG. 3, there are three lists assigned for the code data type 302. Names for code values may also be used. For example, "Schufa" and "Dun & Bradstreet" are names for two codes associated with the provider code list. The code values identify the credit rating agencies "Schufa" and "Dun & Bradstreet." The ISV may want to add a code value for a third credit rating agency, which is listed in a code list associated with the ISV. Here, the code value "1" is associated with "Bürgel" in the ISV code list. It can be seen that two code values for different credit rating agencies may coincide or clash. In the external representation, this coincidental code value is permissible because the code values are assigned to specific code lists, which are unique (e.g., based on supplementary components associated with the code lists, such as the listAgencyID).

In the internal representation, however, the code values may coincide because internal representations of the code data type may not include the supplementary components that provide distinguishing attributes for code values. In the internal representation, a single field may be used to represent the code data type and the code value. For codes without a context, one field can be used to represent the code values, and in this instance, supplementary components are not used. Uniqueness between software vendors and software suites is still desirable in the internal representation. Thus, the single field used in the internal representation includes a unique identifier as part of the code value itself. For example, an ABAP namespace may be used as a prefix for the code values. ABAP namespaces may be used by ISVs for establishing uniqueness in new entities created by ISVs or preexisting entities modified by ISVs (entities including such as objects, reports, classes, and other transportable entities). The ABAP namespace is a general approach to reach uniqueness between ISVs or between ISV suites.

FIG. 4 is a schematic illustration of a code data type having an external representation 404 and an internal representation 420. The external representation 404 includes a code list for the code data type "CreditRatingAgencyCode" 406. With the implementation of the ABAP namespace to the internal representation of the code value, the internal representation 420 may be longer than the external representation 404. In the external representation, there is a code field for the code value 408, and there are code fields for other aspects of the external representation, such as listID 410, listAgencyID 412, and listVersionID 414. The code fields have a defined length to accommodate data values of varying sizes. In some instances, the code value code field in the external representation accommodates a code value of a certain length. In FIG. 4, the code field for the code value accommodates a code value length of 2. With the implementation of ABAP namespaces to the code values, the length of the code field needs to be long enough to accommodate a lengthened code value. This is illustrated by length 12 420, respectively. FIG. 4 also shows the context 418 associated with the code data type 402.

Returning briefly to FIG. 1, an ISV 130 may register with the server 102 of FIG. 1 to register as a developer of business objects and software suites. When the ISV 130 registers with the server 102, the ISV 130 can register an ABAP namespace that is unique to that ISV. Then, when the ISV performs modifications or implements add-on functionality for existing business applications, the code values for the ISV have an associated ABAP namespace in the internal representations of the code value and the code data type (because the code data type has an associated internal representation). This ABAP namespace may be a prefix that is used in the internal representation of the code value for the code data type shown in FIG. 4.

The internal and external representations are mapped together so that code values used in messages transmitted between ISVs and customers can be associated with tasks, business objects, and/or other functionality associated with the business application or other software. For example, a customer may send a message to another customer to execute a task on a business object or provide information that may be used in a process. The information or the tasks may be associated with a code value. The code value, as well as other information, is communicated to the other customer using an XML message that describes the external representation of the code data type. The external representation has code values and corresponding supplementary components that provide uniqueness to the code values. At the receiving customer, the code values are interpreted to accurately execute the proper task on the proper business object. Thus, the code values communicated in the external representation are mapped to the internal representation of the code data type that includes a representation of the code values that includes an ABAP namespace unique to the ISV that provides the functionality and originates the code value, or the business application add-on software associated with the ISV that originated the code value.

Both representations are logically equivalent and can be mapped 1:1 using mapping techniques. The internal representation (single value with prefix in the no-context scenario) is used as much as possible; and the external representation (triple with supp. comp.) is used where needed. For example, the internal representation 420 is used in the user interface, the proxy, the service provider, the system tables, the configuration tables, and the Business Object (BO) persistency. Both representations of the code data type are defined in the metadata repository, such as MDRS 104 from FIG. 1.

The internal representation may be mapped directly to the external representation (and vice versa). In certain implementations, a mapping table can be used to map the two representations.

The mapping between both representations happens during serialization. That is when XML message instances are created (Outbound) or received (Inbound). In other words, the mapping is achieved by simple transformation (serialization/deserialization) in certain implementations. In certain implementations, tables can be used to map the internal representation to the external representation. An example table is shown in FIG. 5A. FIG. 5A is an example table 500 illustrating a mapping between the code values with a unique identifying prefix and the code values for the external representation. In FIG. 5A, table 500 illustrates a mapping between internal representations of code values that include unique identifiers, in this case unique prefixes such as ABAP namespaces, and the external representation of the code values. For example, code value/ISV1/1 502 is the internal representation of the code value associated with the ISV from FIG. 3. The code value includes the prefix/ISV1/that provides a unique identification that corresponds to the entity that originated or issued the code value—in this case, ISV having listID "1" and listAgencyID "www.ISV1.com." The table maps the internal representation of the code value 502 to the external representation 310. The table also provides an internal representation of the corresponding code list 504. In certain implementations, the internal representation of the code value is used as much as possible to provide for the identification of the issuing entity for internal consumers of the code values (e.g., the users of the code), and for providing the mapping of the internal representation to the external representation at serialization/deserialization of the XML messages. The external representation may be in the CCTS standard, which may be an XML representation. The mapping itself takes place at the serialization/deserialization.

FIG. 5B provides further mapping between the internal and external code lists. FIG. 5B is a table 550 illustrating a mapping between the internal representation of the code lists and the supplementary components (which may be used to establish uniqueness of the external representations). For example, the internal representation of the code list 504 is mapped to the listID 316 and the listAgencyID 318, which are supplementary components shown in FIG. 3 and provide uniqueness to the external representation of the ISV code.

Figure 6:
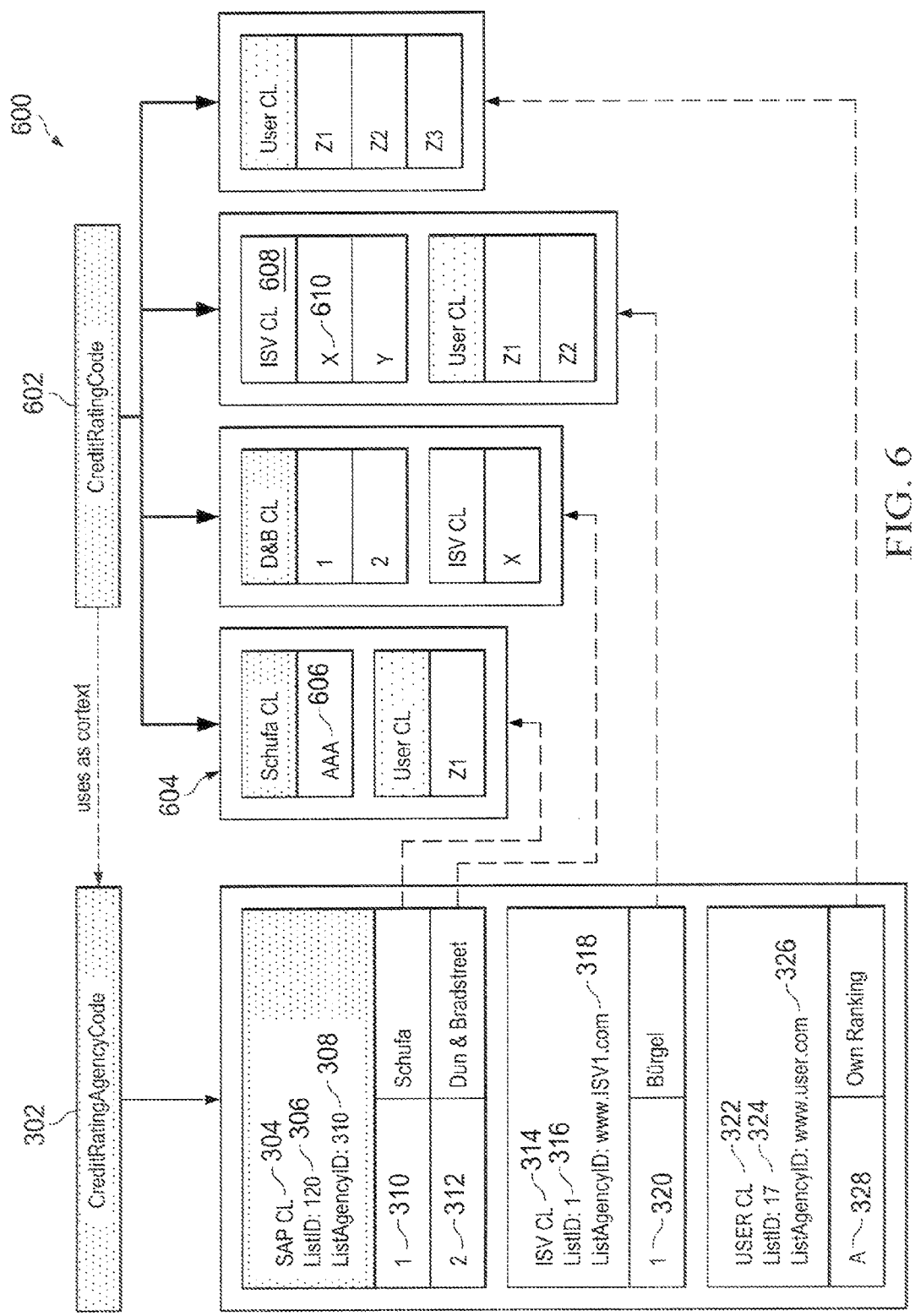
FIG. 6 is a schematic illustration of an external representation of a code data type and an accompanying context code data type.

In certain implementations, a code data type may include a context code data type that provides contextual information for the code data type. For example, in FIG. 4, the code data type is shown with the internal and external representations, and is shown with a code context 418. The code context 418 may be an identifying context that provides additional (often semantic) information about the code data type. FIG. 6 is a schematic illustration 600 of an external representation of a code data type and an accompanying context code data type.

FIG. 6 illustrates the abstract connection between the external representation of the code data type 302 and the context 602. CreditRatingCode data type 602 provides credit rating code values that may provide additional information associated with the credit rating agencies provided in the external representation of the CreditRatingAgencyCode data type 302. For example, the code list 604 provides code value AAA 606 for credit ratings associated with the Schufa credit rating agency. Similarly, the code list 608 includes code values for the ISV. For example, the code value X may be associated with the code list 314 for the CreditRatingAgencyCode. The code values may be provided by the service provider or by another issuing entity. FIG. 7 is a table 700 showing the mapping between the external representation of the code data type having a context with possible internal representations having identifiers with the code values. The internal representations of the code data types and the corresponding contexts have the same unique identifier "ISV 1" for different aspects of the table. For example, the identifier for the code data type ISV1/1 702 is mapped to the context identification ISV1/X 704 using the internal representation. The internal representations are mapped to the external code "X" 602 and the internal representations for the code list "ISV1/3" 706. The context (in this case, the credit rating associated with the credit rating agency code) is an additional key field in the table 700. In this implementation, no direct mapping can be done from the database representation of the credit rating code to the external representation. You always need the credit rating agency, as well (in that sense, the credit rating agency code provides context for the credit rating code). While the external representation is unique without any context due to the supplementary components, the database representation does need the context. The database representation corresponds to the external representation shown in FIG. 6.

Figure 8:
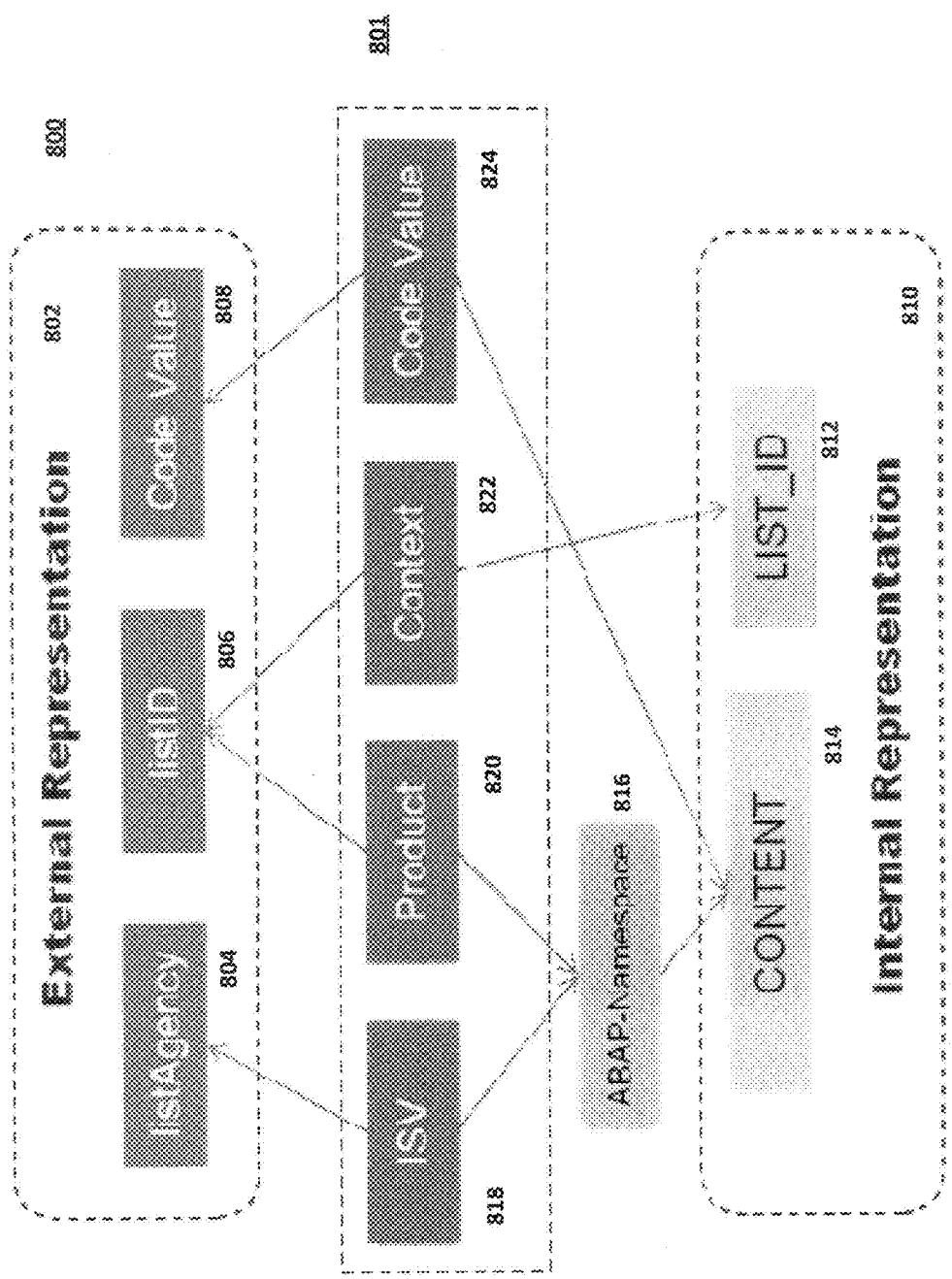
FIG. 8 is a graphical representation for mapping between the internal representation and the external representation.

Returning to the mapping techniques, FIG. 8 shows an example mapping. FIG. 8 is a graphical representation 800 for mapping between the internal representation and the external representation. FIG. 8 depicts the abstract entities behind the different representations: the company that defines the code (ISV) 818, the solution of the company (product) 820, the context in which a code is defined 822, and the code value itself 824. The upper and the lower part then show the external 802 and internal representation 810, respectively.

The actual mapping may start from one of the two concrete representations (i.e., either the internal representation 810 or the external representation 802). As mentioned above, external representation 802 includes listAgencyID 804, listID 806, and the code value 808. The internal representation has either a single field (in the no-context case) or two fields (if a context is used) to express the content 814 and mapping to list ID 812 for context. The ABAP namespace is part of the content field 814. In principle, it first has to determine the abstract entities 801 and, from this, the other concrete representation. This would imply that either CONTENT 814 or listID 812—depending on the mapping direction—is parsed to determine their constituents, so that the actual mapping tables would be small: If the code values were identical and the context could be mapped by an algorithm, only a mapping from ABAP namespace 818 to ISV (e.g., listAgency) 804 and product 820 would be needed. If listIDs had to be different across different GDTs, the mapping table would be slightly bigger.

It would also be possible to do without this parsing and instead invest in memory and database space by providing an explicit mapping for every single code. This latter approach would be required if the code value part in the different representations was not the same in all cases. In that situation, the parsing approach could only reduce the width of the mapping table (by not including listAgency and listID in every single row), but not the number of rows.

As stated above, the internal representation of a code uses an ABAP namespace to distinguish between different originators of the code value. The natural choice here is to reuse existing ABAP namespaces and not introduce new ones. All customers have one ABAP namespace assigned to them that is used, e.g., for field names when extension fields are created. This ABAP namespace can certainly be used for customer-owned code values, as well (something like/CUSTnnn/1). The usage of the ABAP namespace is only mandatory for system code values. For configuration code values, the 'Z' namespace is sufficient for customer-owned values, since there cannot be any clashes of multiple customers within a tenant. This would also avoid any data migration, since today customers use the 'Z' namespace.

All ISVs have a product-based ABAP namespace, i.e., a different one for every add-on. This namespace should be used for all code values, system code values, and configuration code values. The LIST_ID (or actually context) in the internal representation is used only if there is an identifying context for a code type; its value derived uniquely from the current context, so there is no customer or ISV-specific assignment needed.

In the external representation, the code list agency ID and the list ID are considered. Beginning with the code list agency ID: in addition to the ABAP namespace, customers are also assigned an XML namespace that is already used in XML messages to identify customer-owned metadata. This namespace could be used as the code list agency ID. Unlike in the internal representation, there is no distinction between system codes and configuration codes.

For ISVs, a determination is made whether to go for a purely company-based list agency ID irrespective of the add-on or if the agency may differ between different add-ons. In the latter case, one could use the product-related XML namespace for the list agency ID. In the former case, the ISV could choose one that is used in all products. At this point, there does not seem to be much of a difference between these choices; however it has wide-ranging consequences.

If there was a list agency ID per add-on, it would mean that there would be a 1:1 correspondence between ABAP namespace and list agency ID. Furthermore, clashes of code values of different add-ons of the same ISV would be avoided due to the list agency ID. This would mean that list IDs would be optional for codes that have no context; furthermore, the provider list ID could be reused where necessary. This may also mean that for codes with a context, there would be a 1:1 relation between the context and the list ID.

If there was only one list agency ID for an ISV that develops different products, code list extensions in these different products could lead to clashes of code values. One way of avoiding them would be a strict governance process within the ISV organization, which is difficult to impose by providers and could thus lead to future problems. Another way would be to introduce add-on related list IDs. This would imply that List IDs are needed for codes that do not have a context, whereas, for provider code values, the list ID can be omitted. In addition, for codes with a context, in general, there cannot be a 1:1 relation between the context and the list ID—again, unlike for provider codes, where there is this 1:1 relation.

From an architectural point of view, the add-on based list agency ID would be favored, since this would reduce the complexity of the mapping considerably. However, from a modeling perspective, the code list agency is defined as some kind of organizational body. For this reason, the decision was to utilize one code list agency ID per ISV. This is shown in FIG. 10. FIG. 10 is a schematic illustration of an ISV-based code list agency and product-based list ID. In this scenario, there are two different add-ons of the same ISV that extend the same code GDTs. The product namespace in the list ID ensures that these different values do not clash in the external representation. In the internal representation, this is ensured by the product-based ABAP namespace.

This approach is also compatible with the PDI approach, where the XML product namespace actually is a concatenation of the User Resource Link (URL) of the ISV and a product name. This product name can then be used as a namespace in the listID.

Due to the modeling decision for the list agency ID, the code list ID is needed even for codes without a context, since it serves to separate code values from different products of the same ISV. Only codes from the same add-on will belong to the same code list. The easiest way to achieve this (without having to resort to a governance process for code list IDs) is the usage of namespaces in the list ID itself. The natural namespace for this in the partner environment is the product name, since the XML namespace of the product is actually a concatenation of the partner Uniform Resource Indicator (URL) and the product name.

Apart from distinguishing between code values of different ISV add-ons, the code list ID also has to separate code values of codes that belong to different contexts (note that for the internal LIST_ID this is the only task).

Further, it must also be decided if list IDs should only be unique with respect to a code data type or if they have to be unique across all code data types. The former treats code lists as subentities of the code GDT, while the latter implies that code GDTs and code lists are independent entities that are only assigned to each other.

If list IDs only have to be unique with respect to a code data type, they only have to separate between different add-ons of the same partner and between different contexts. Thus, it would be possible to calculate the list ID from these two inputs. The advantage of this is that no separate mapping table for list IDs would be used, which would also mean that the list IDs would not have to be maintained or transported.

If there is only one context, this would be very straightforward and a simple concatenation would lead to examples, such as:

listID="Product1/DE"

This becomes more complicated for multi-component contexts. While in the internal LIST_ID, every context component starts at a well-defined offset, since unused characters of a context component are filled up with whitespaces, but this is not the case for the external list ID, which is typed as a token so that multiple whitespaces have to be collapsed, i.e.:

LIST_ID="1 2 "would be translated to listID="Product1/1 2".

In the unlikely case that a context instance contains a space as well, this might lead to ambiguities. One option of dealing with this would be introducing escape characters or separators like e.g., '^'.

This is illustrated in the following example. Let the context be given by three char Country Code 'DE', three char Region Code ' ', and four char Tax Type Code 'MWS'.

---

ABAP
   TAX_GROUP_CODE-CONTENT = 'FULL'

-continued

```
TAX_GROUP_CODE-LIST_ID = 'DE MWS'
XML
    <TaxGroupCode listID="DE MWS">FULL</TaxGroupCode>
```

Obviously the context Country Code 'DE', Region Code 'MWS', Tax Type Code ' ' would lead to the same listID.

This ambiguity can be avoided by introducing a separator ^.

```
<TaxGroupCode listID="DE^^MWS">FULL</TaxGroupCode>
<TaxGroupCode listID="DE^MWS^">FULL</TaxGroupCode>
```

A further complication occurs if there are contexts that are extended code values such as when a new country code is added by an ISV (even if this code is not extensible for a range of reasons). The new country code may have the following representations:

Internal representation: /ISV1PRD1/FN
External representation:
Code: FN
listIID: Product1/
listAgencyID: http://www.isv1.com.

If a new region code is defined with respect to this country, the listID for the RegionCode could use either the internal or the external representation of the country code. Using the internal representation permits for a shorter field length.

In certain implementations, the internal representation may support multi-tenancy situations. Certain information that is stored is tenant-specific and other information is tenant-nonspecific. Multiple companies can run a particular software program or suite. From the perspective of the service provider, each company can be considered a tenant. Different companies may run as different tenants on the same system. The service provider separates between the data associated with each tenant company. Thus, the database tables may have a key field that identifies a tenant (in a client field), which ensures that data from different tenants is not mixed. Also, a first tenant's data should be invisible to a second tenant's data. This is provided for security purposes and for other reasons.

The client-nonspecific data is the data needed to run the program itself. Business object definitions are not defined for specific clients, but are the same for most or all customers. When there are multiple tenants on the same system, a single change to a BO definition can propagate to all client because the BO definition is the same for all tenants.

For ISVs offering add-on functionality to the service provider software suite, it is still advantageous to provide the code once for all customers; but at the same time, the ISV specific add-on to the software should only be accessible to customers who have paid for it or are otherwise authorized to use the new functionality. For example, an ISV may define a new business object for, e.g., handling of credit cards. The ISV may want to sell this functionality to customers using the software provided for handling of credit cards. The functionality additions should be the same for customers authorized to access the functionality; and customers that do not have authorization to use the added functionality provided by the ISV should not be able to see, view, access, or otherwise interact with the new functionality.

A switch or filter may be provided that is client-specific to provide client-specific data to clients. If a client has authorization to view the added functionality, the filter would permit the user to view and/or access the functionality. For customers who do not have authorization to use the new functionality, the filter would restrict those customers from viewing the additional functionality, even though that functionality is still transported as part of the software suite. This filter permits the software suite to be changed once based on the ISV's added functionality to maintain its generality, but provide the added functionality in a client-specific way.

The switch is associated in an indirect way. Business objects are transport objects. These transport objects are grouped in software packages and to these software packages, switches may be assigned. The switches may be in client-dependent tables.

At runtime, the system checks what the BO is, what the transport object is, what the corresponding package is, and what the state of the switch is. For a specific tenant, the switch will have a specific tenant. If the value for the switch is in a true or on state, the functionality is provided; and if the value for the switch is in a false or off state, the functionality is not provided, and an error message may be provided, or other steps required.

For the code values, there are certain characteristics of the code values to support the multi-tenancy situation. Code values that belong to a specific ISV solution should only be visible to the customer at runtime if the functionality is available to the customer. For example, if a code data type is modeled in a business object and is displayed on a user interface, the customer may view the possible values for available codes that are active for the customer/tenant.

System codes may also be used to support multi-tenancy. System codes correspond to entities that are client-independent or nonspecific. An example is the object type code for the business object type code. Business objects have codes identifying the business object type code and one or more unique names. The business object type code is stored in an entity table, which is a client-independent table. The table includes information such as the corresponding business object for the type code and other information. Business object type codes can be modeled in a business object. For example, a task object may specify a task to be executed somewhere in the system. The task object specifies for this task for which business object the task is executed. In the task object, there is a field indicating the business object on which the task is to be executed, and this field is typed by the business object type code. The task instance is tenant-specific (each task belongs to a specific tenant); in such an instance, there is a value for the code, and the entity for the code is client-nonspecific. The possible values are in a client-independent table, but the specific code values are in a client-dependent table. The information is in a client-independent table, but a filter is still used to show part of the values.

With each code value of such system codes, information on where the switch can be found is stored. With the BO type code, the identification of the corresponding business object is stored. System codes include an attribute field that indicates where the switch can be found.

As stated above, switches can be associated with transport objects. If for each code value of a system code, there is a corresponding transport object, there also is provided a switch assignment. This transport object can then be regarded as a primary source of information for the codes such that the code value itself is transported as part of the transport object.

In the present disclosure, two kinds of such transport objects or primary sources of information are provided: Business Configuration (BC) sets and meta objects (MOs) from the MDRS.

The MO or BC set in which the code values are defined needs to include information about the internal and external code representation, including supplementary components and namespace. If the external code representation and the supplementary components can be calculated from the internal representation, the context and some limited central information, the internal representation is sufficient. In the event the code list needs an external number, there may be a mapping table from GDT, context and add-on to the code list ID.

Note that transporting the codes with an MO or BC Set does not offer a natural way of transporting additional data of a code list. The identification of the code list (list ID and list agency ID) can be derived from the supplementary components of a code so that the code list instance and the association of the code to the code list can be created. Additional data of a code list, such as a description (or even a code list number that cannot be calculated), however, cannot be treated in the same way. If it was transported together with each individual code, there exists the risk of inconsistencies, since different codes of the same list could come with different list descriptions. The MO itself would not offer any other possible place for these additional attributes, since one list would usually contain multiple MO instances.

Thus, in some ways the additional information could be transported if the code list was created directly as an independent object and only the code values were transported via the MO or BC-set/Business Configuration Object (BCO). This, however, seems very cumbersome and error-prone.

The code list may be transient and may not have additional attributes. In the event that the code list needs an external number, there may be a mapping table from GDT, context and add-on to the code list ID.

MOs may be used as a primary sources of information for those system codes, where the code values are alternative keys of meta object entities in their own right. Examples for this are:

ProcessComponentCode
ObjectTypeCode
ObjectNodeTypeCode
ServiceInterfaceCode
ServiceInterfaceOperationCode
MessageTypeCode In these cases, it is advantageous to define the code within the meta object itself, i.e., when designing the particular process component of the business object. This also means that the attributes of the code (which, in general, will be a subset of the MO data) are also maintained together with the code. Furthermore, the MOs have then also the desired transport granularity, since there will be code value imported if, and only if, the corresponding meta objects are also imported.

In these cases, there may exist a sibling S-table BCO (Business Configuration Object) to expose the data of the table. When the MO is activated or imported, a notification mechanism is needed so that the BCO content can be reloaded.

There are also other system codes without such a natural meta object as a primary source of information (actually, the majority of cases). For these, BC sets will be defined (similar to those for configuration codes) which then are the primary source of information and the relevant transport objects for the client-dependent switching.

Each system code value of an ISV is related to a transport object; either a MO or a BC set. These transport objects reside in packages that have a client-dependent switch if it is partner content. Thus, the system code value also has a relation to a client-dependent switch. The code value must be visible if the switch is on and invisible if the switch is off.

Currently, the values of system code types are stored in and transported using legacy entity tables (S tables). Some of them may completely be removed and replaced by the corresponding MO entities. For others, this is not practical, since they are used by many consumers. Thus, they will stay in the backend without too many changes.

These S tables pose two challenges:
They have to handle multi-tenancy;
They have to be transported or filled somehow.

The S table could in principle stay as it is (with a lengthened key field to reflect the longer internal representation) and an additional client-dependent activation table could be put next to it. ISV codes would be kept in the same table. This would mean that the table entries could be transported with standard transport mechanisms; the activation table would have to react to life cycle events, such as the switching of the partner solution.

The approach is implementable without the additional table. This concept is illustrated in FIG. 9. FIG. 9 is a system table design 900 to support multi-tenancy situations. The system table key is longer to reflect the new internal representation of the code, and there is an additional column for the transport object to which the code is related. This effectively expresses the client-dependent activation information of the code.

Since the primary source of information for the code values is a separate transport object, the table entries will be written as an after import method of the import of the corresponding transport object.

The low level access class of the table must return those codes that are active for a specific client only. It can identify this by ask the switch framework if the switches of the (packages of the) related transport objects are active or not. This way, the activation information is always taken from the source (switch framework) and not from a redundant cache, such as an activation table. As a consequence, there also does not have to be any reaction to tenant switches; the only relevant life cycle events are connected with changes of the transport object itself.

In FIG. 9, the transport object is only filled for the ISV content. The idea behind this is that the transport object is only needed for actually client-dependent content. By leaving it empty for client-independent content, a performance gain may be achieved, and there is no adoption need for the provider content—the table can simply be extended by the new column. This approach would create problems if an object is created in a package without a client-dependent switch and later the package receives a client-dependent switch or the object is moved to such a package. In this event, it would be very difficult to detect the event so that the transport object could be entered into the table. However, such a change is very unlikely, and virtually impossible in a partner scenario. Nevertheless, the performance impact may be evaluated for scenarios if the transport object information was added to provider entries, as well.

Multi-tenancy implies that all consumers have to be given the correct client-dependent information. This information might be relevant in several situations such as, e.g., value help requests on the end-user User Interface (UI) or in BC, or checks within service providers or frameworks to which valid codes were provided.

A safe way to do this is by introducing multi-tenancy on the lowest level possible. For the MDRS, this is the MDRS service provider, or the Data Access Components (DACs), that read data from the database. The client-dependent switches should be taken into account so the MDRS service providers do not return code values that are not active for the respective client. For the backend, this means that basically there should be no direct access to the S tables, but that all consumers must use the low level access classes. This may be a preset rule so that at least for the applications there should not be much additional adoption effort. Apart from the low-level access classes, there are a few other generic services that directly access the S tables. One of them is the generic code list provider, and another one is the BC consistency check.

The present disclosure describes embodiments of providing code list extensibility. Other embodiments and advantages are recognizable by those of skill in the art by the forgoing description and the claims.

What is claimed is:

1. A computer implemented method for providing code list extensibility, the method comprising:
    providing an external representation of a code data type, the external code data type representation having at least one external code value generated by a developer of at least one of a business object or a software suite for an existing business application and used by customers or software vendors;
    providing an internal representation of the code data type, the internal data type representation having a second code value representation for the at least one internal code value, the internal code value representation including a unique identifier for the developer and is used by a database for the business application; and
    mapping the external code data type representation and the internal code data type representation based at least in part on the unique identifier for the developer.

2. The method of claim 1, wherein the second code data type representation accommodates an Advanced Business Application Programming (ABAP) namespace.

3. The method of claim 2, wherein the unique identifier is an ABAP namespace prefix.

4. The method of claim 1, wherein the unique identifier is a first unique identifier associated with a first software program associated with the developer.

5. The method of claim 4, further comprising a second unique identifier associated with a second software program associated with the developer.

6. The method of claim 1, wherein the external code data type representation further comprises an agency identifier, the agency identifier identifying the code value issuing entity.

7. The method of claim 1, wherein the external code data type representation is a Core Components Technical Specification (CCTS) based representation.

8. The method of claim 1, wherein the mapping is performed by serialization.

9. The method of claim 1, wherein the internal code data type representation unique identifier provides a unique prefix associated with the developer the internal code data type representation further identifying a system type code, the system type code identified using the unique identifier.

10. The method of claim 9, wherein the internal code data type representation also includes a transport object identifier, the transport object identifier including the unique prefix and a customer identifier.

11. The method of claim 1, wherein the internal code data type representation further comprises a client specific switch value, the client specific switch value facilitating a client specific filtering of code values.

12. A system for providing code list extensibility, the system comprising:
    a memory for storing instructions; and
    at least one hardware processor operable to execute instructions stored on the memory to:
    provide an external representation of a code data type, the external code data type representation having at least one external code value generated by a developer of at least one of a business object or a software suite for an existing business application and used by customers or software vendors,
    provide an internal representation of the code data type, the internal data type representation having a second code value representation for the at least one internal code value, the internal code value representation including a unique identifier for the developer and is used by a database for the business application; and
    map the external code data type representation and the internal code data type representation based at least in part on the unique identifier for the developer.

13. The system of claim 12, wherein the internal code data type representation accommodates an ABAP namespace.

14. The system of claim 13, wherein the unique identifier associated with the code value issuing entity is an ABAP namespace prefix.

15. The system of claim 12, wherein the internal unique identifier is a first unique identifier associated with a first software program associated with the developer.

16. The system of claim 15, further comprising a second unique identifier associated with a second software program associated with the developer.

17. The system of claim 12, wherein the external code data type representation further comprises an agency identifier, the agency identifier identifying the code value issuing entity.

18. The system of claim 12, wherein the external code data type representation is a CCTS based representation.

19. The system of claim 12, the system further operable to receive a registration from the developer to establish the unique identifier.

* * * * *